US012321995B2

(12) United States Patent
Shao et al.

(10) Patent No.: US 12,321,995 B2
(45) Date of Patent: Jun. 3, 2025

(54) METHOD FOR GAS SUPPLY DEPLOYMENT OF SMART GAS PIPELINE NETWORK AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Guanghua Huang, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/675,125

(22) Filed: May 27, 2024

(65) Prior Publication Data
US 2024/0311936 A1    Sep. 19, 2024

(30) Foreign Application Priority Data
Apr. 9, 2024   (CN) .......................... 202410422073.3

(51) Int. Cl.
*G06Q 50/06*    (2024.01)
*G06Q 30/0204*    (2023.01)

(52) U.S. Cl.
CPC ......... *G06Q 50/06* (2013.01); *G06Q 30/0205* (2013.01)

(58) Field of Classification Search
None
See application file for complete search history.

(56) References Cited

U.S. PATENT DOCUMENTS

2008/0319811 A1* 12/2008 Casey .............. G06Q 10/06311
                                                                                  705/7.13
2014/0091629 A1*  4/2014 Ishibashi ................ H02J 9/062
                                                                                  307/66
(Continued)

FOREIGN PATENT DOCUMENTS

CN        101776909 A      7/2010
CN        113033973 A      6/2021
(Continued)

OTHER PUBLICATIONS

First Office Action in Chinese Application No. 202410422073.3 mailed on Jun. 12, 2024, 19 pages.
(Continued)

*Primary Examiner* — Alan Torrico-Lopez
(74) *Attorney, Agent, or Firm* — METIS IP LLC

(57) ABSTRACT

Method for gas supply deployment of smart gas pipeline network and an IoT system thereof are provided, the method including: obtaining historical gas consumption data in the target region; determining target demand information of the target region at a future time point; predicting a target difference amplitude of a gas supply and demand difference at the future time point in the target region; for the target region where the target difference amplitude meets a first preset condition, determining, based on gas statistical data, the target difference amplitude, and environmental data of the target region, a reason for supply and demand difference corresponding to the target region; determining, based on the target difference amplitude and the reason for supply and demand difference, a gas supply adjustment parameter, generating a gas supply adjustment instruction; and in response to remaining storage space meeting a second preset condition, generating a distribution instruction.

10 Claims, 5 Drawing Sheets

(56) References Cited

U.S. PATENT DOCUMENTS

| | | | |
|---|---|---|---|
| 2016/0239034 A1* | 8/2016 | Chan | H02J 13/00002 |
| 2023/0170700 A1 | 6/2023 | Hamaguchi et al. | |
| 2024/0110674 A1 | 4/2024 | Shao et al. | |

FOREIGN PATENT DOCUMENTS

| CN | 113722557 A | 11/2021 |
|---|---|---|
| CN | 114399101 A | 4/2022 |
| CN | 114692396 A | 7/2022 |
| CN | 116258347 A | 6/2023 |
| CN | 116307043 A | 6/2023 |
| CN | 116566036 A | 8/2023 |
| CN | 117575341 A | 2/2024 |

OTHER PUBLICATIONS

Decision to Grant a Patent in Chinese Application No. 202410422073.3 mailed on Jul. 1, 2024, 4 pages.

Liu, Bo, Research on intelligent forecasting technology of city gas short-term load, CNKI, 2023, 86 pages.

Shao, Zehua et al., Research and Construction of Intelligent Gas Meter Intelligent Industrial Internet of Things System, Internet of Things Technologies, 13(6), 2023, 8 pages.

Duan, Yanzhi et al., Forecasting the short-term urban gas daily demand in winter based on the XGBoost algorithm, IOP Conference Series: Earth and Environmental Science, 675, 2021, 11 pages.

* cited by examiner

METHOD FOR GAS SUPPLY DEPLOYMENT OF SMART GAS PIPELINE NETWORK AND INTERNET OF THINGS SYSTEM THEREOF

CROSS-REFERENCE TO RELATED APPLICATION

This application claims priority to Chinese application No. 202410422073.3 filed on Apr. 9, 2024, the entire content of which is incorporated herein by reference.

TECHNICAL FIELD

The present disclosure is related to a field of energy supply, and in particular relates to a method for gas supply deployment of smart gas pipeline network and an Internet of Things system thereof.

BACKGROUND

With a continuous development of science and technology and an advancement of intelligent technology, gas supply, as an important part of an energy supply field, requires an introduction of advanced technological means to improve a management efficiency and user experience.

CN101776909A provides a method for dynamically predicting gas supply and demand in an iron and steel enterprise, which includes a segmented short-term dynamic prediction modeling method based on historical statistical data, combined with production status information, and comprehensively using real-time data, production status data, and production process parameter data. At the same time, based on the model, the above method constructs a gas supply and demand dynamic prediction system. The above method adopts the model to predict the gas supply and demand, but does not have a systematic monitoring and management on the gas.

Therefore, it is desired to provide a method for gas supply deployment of smart gas pipeline network and an Internet of Things system thereof, which are capable of systematically managing the gas supply, so as to improve the efficiency and quality of the gas supply, and to improve the user experience.

SUMMARY

One or more embodiments of the present disclosure provide a method for gas supply deployment of smart gas pipeline network, including: controlling a gas metering device in a target region to obtain gas statistical data at a preset frequency and storing the gas statistical data in a storage unit; obtaining historical gas consumption data in the target region; determining, based on the historical gas consumption data, target demand information of the target region at a future time point, a number of the future time point being positively related to a remaining storage space of the storage unit; predicting, based on the target demand information, a target difference amplitude of a gas supply and demand difference at the future time point in the target region; for the target region where the target difference amplitude meets a first preset condition, determining, based on the gas statistical data, the target difference amplitude, and environmental data of the target region, a reason for supply and demand difference corresponding to the target region; determining, based on the target difference amplitude and the reason for supply and demand difference, a gas supply adjustment parameter, and storing the gas supply adjustment parameter in the storage unit, generating, based on based on the gas supply adjustment parameter, a gas supply adjustment instruction, and sending the gas supply adjustment instruction to a terminal device; and in response to the remaining storage space meeting a second preset condition, generating a distribution instruction, the distribution instruction being configured to store, based on a distribution ratio of an available storage space of each of the target regions, the gas statistical data obtained by each of the gas metering devices, the distribution ratio being positively related to a number of gas metering devices.

One or more embodiments of the present disclosure provide an Internet of Things (IoT) system for gas supply deployment of smart gas pipeline network. The smart gas safety management platform may be configured to: control a gas metering device in a target region to obtain gas statistical data at a preset frequency and store the gas statistical data in a storage unit; obtain historical gas consumption data in the target region; determine, based on the historical gas consumption data, target demand information of the target region at a future time point, a number of the future time point being positively related to a remaining storage space of the storage unit; predict, based on the target demand information, a target difference amplitude of a gas supply and demand difference at the future time point in the target region; for the target region where the target difference amplitude meets a first preset condition, determine, based on the gas statistical data, the target difference amplitude, and environmental data of the target region, a reason for supply and demand difference corresponding to the target region; determine, based on the target difference amplitude and the reason for supply and demand difference, a gas supply adjustment parameter, and store the gas supply adjustment parameter in the storage unit, generate, based on based on the gas supply adjustment parameter, a gas supply adjustment instruction, and send the gas supply adjustment instruction to a terminal device; and in response to the remaining storage space meeting a second preset condition, generate a distribution instruction, the distribution instruction being configured to store, based on a distribution ratio of an available storage space of each of the target regions, the gas statistical data obtained by each of the gas metering devices, the distribution ratio being positively related to a number of gas metering devices.

One or more embodiments of the present disclosure provide a computer-readable storage medium storing computer instructions. When reading the computer instructions in the storage medium, a computer implements the method for gas supply deployment of smart gas pipeline network.

The method for gas supply deployment of smart gas pipeline network described in some embodiments of the present disclosure may more accurately predict a gas supply volume and a gas demand volume at different future time points and select an appropriate way for gas replenishment or device maintenance for different reasons for supply and demand differences. At the same time, it may be possible to focus on a supervision of a region with a great gas demand or a great difference in magnitude, and systematically manage the gas supply, so as to improve the efficiency and quality of the gas supply and improve the user experience.

BRIEF DESCRIPTION OF THE DRAWINGS

The present disclosure is further illustrated by way of exemplary embodiments, which are described in detail by means of the accompanying drawings. These embodiments are not limiting, and in these embodiments, the same numbering denotes the same structure, wherein.

DETAILED DESCRIPTION

Figure 1:
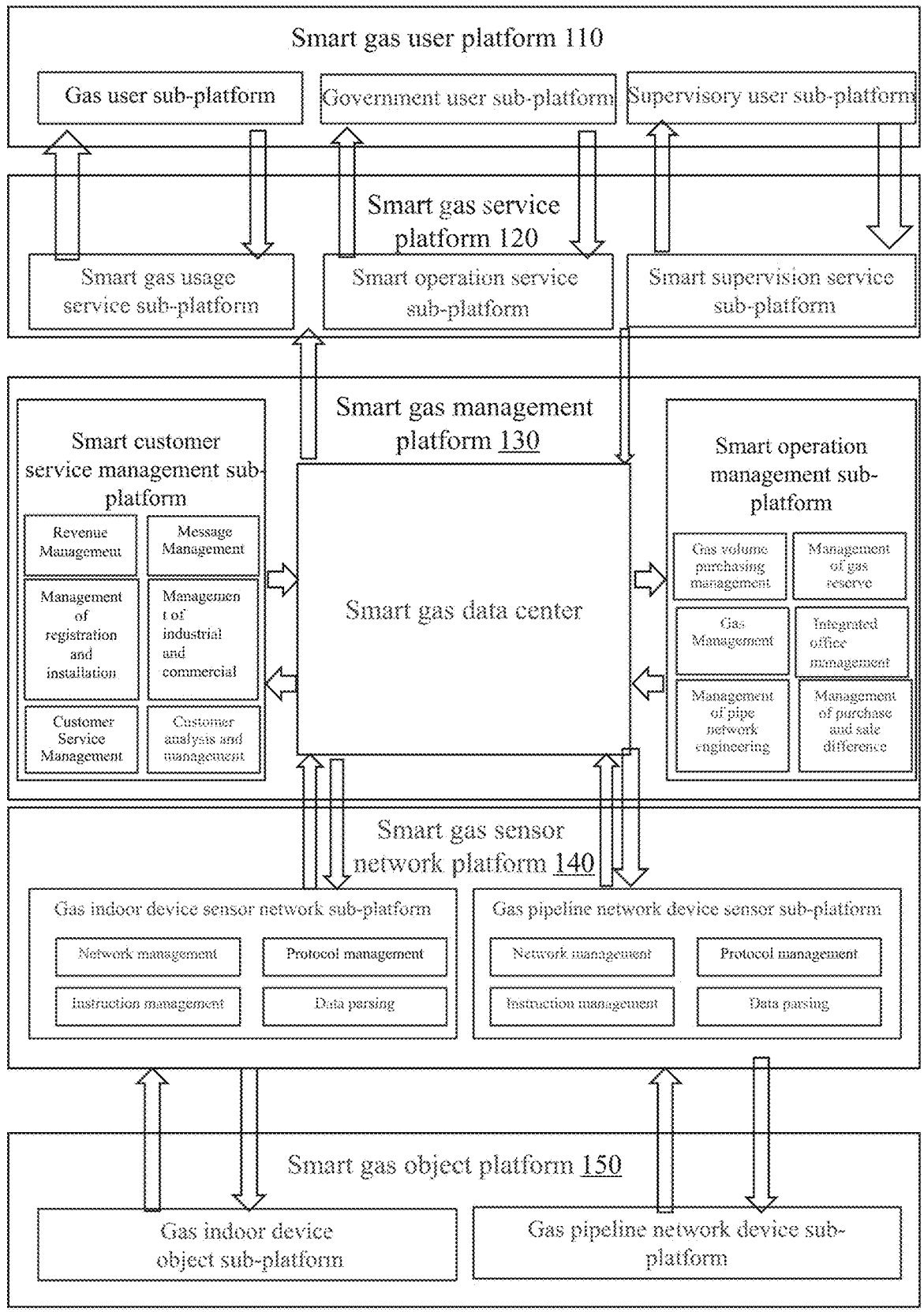
FIG. 1 is a diagram illustrating an exemplary platform structure of an Internet of things (IoT) system for gas supply deployment of smart gas pipeline network according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it may be possible for those skilled in the art to apply the present disclosure to other similar scenarios in accordance with these drawings without creative labor. Unless obviously obtained from the context or the context illustrates otherwise, the same numeral in the drawings refers to the same structure or operation.

Flowcharts are used in the present disclosure to illustrate operations performed by a system in accordance with embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from them.

The deployment of gas supply needs to consider a variety of factors and conditions, CN101776909A only proposes a method for dynamically predicting gas supply and demand, which is implemented through a segmented short-term prediction based on historical statistical data, production status data and relevant real-time data. However, the method does not involve long-term systematic monitoring and management on the gas supply. Therefore, some embodiments of the present disclosure propose a method for gas supply deployment of smart gas pipeline network and an Internet of Things (IoT) system thereof, which is capable of systematically managing the gas supply, predicting a gas supply volume to be deployed, and improving efficiency and quality of the gas supply and quality.

FIG. 1 is a diagram illustrating an exemplary platform structure of an IoT system for gas supply deployment of smart gas pipeline network according to some embodiments of the present disclosure.

In some embodiments, an IoT system for gas supply deployment of smart gas pipeline network may include a smart gas user platform 110, a smart gas service platform 120, a smart gas management platform 130, a smart gas sensor network platform 140, and a smart gas object platform 150.

In some embodiments, the smart gas user platform 110 may include a gas user sub-platform, a government user sub-platform, and a supervisory user sub-platform.

The gas user sub-platform may be a platform that provides a gas user with data related to a gas usage as well as solutions to gas problems. The gas user may be an industrial gas user, a commercial gas user, an ordinary gas user, etc.

The supervisory user sub-platform may be a platform for a supervisory user to supervise an operation of the entire IoT system. The supervisory user may be a person from a safety management department.

The government user sub-platform may be a platform that provides data related to the gas operation for a government user. The government user may be a manager of a gas operation entity, etc.

In some embodiments, the smart gas service platform 120 may include a smart gas usage service sub-platform, a smart operation service sub-platform, and a smart supervision service sub-platform.

The smart gas service sub-platform may be a platform that provides the gas user with information related to a gas device and communicates with the gas user sub-platform.

The smart operation service sub-platform may be a platform that provides the government user with information related to the gas operation and communicates with the government user sub-platform.

The smart supervision service sub-platform may be a platform that provides the supervisory user with information related to safety supervision and communicates with the supervisory user sub-platform.

The smart gas management platform 130 may be a platform for overall planning and coordinating connections and cooperation among various functional platforms, gathering all information of the IoT system, and providing functions of perceptual management and control management for the IoT operation system.

A target region refers to a region where a number of gas network device object sub-platforms connected by a gas network device sensing network sub-platform are located.

In some embodiments, the smart gas management platform 130 may determine gas supply adjustment parameters and store them in a smart gas data center, and the smart gas management platform 130 may generate gas supply adjustment instructions sent to the smart gas service platform 120 or sent to the gas network device object sub-platform via the gas network device sensing network sub-platform.

In some embodiments, the smart gas management platform 130 may include a smart customer service management sub-platform, the smart gas data center, and a smart operation management sub-platform.

In some embodiments, the smart gas management platform 130 may determine gas demand information for at least one target region at a future time point, and determine a triggering reason of the corresponding difference between supply and demand in the target region based on the data stored in the smart gas data center.

The smart customer service management sub-platform may be a platform for processing information related to gas users. In some embodiments, the smart customer service management sub-platform may include modules for a revenue management, a commercial and industrial management, a reporting management, a customer service management, a message management, and a customer analysis management. The smart customer service management sub-platform may analyze and process information related to the gas user through each of the aforementioned management modules.

The smart gas data center may aggregate and store all operational data of the system. In some embodiments, the smart gas data center may be configured as a storage device for storing data related to the IoT system for gas supply deployment of smart gas pipeline network.

The smart operation and management sub-platform may be in bi-directional communication with the smart gas data center, and in some embodiments, the smart operation and management sub-platform may include a gas procurement management module, a gas storage management module, a gas consumption scheduling management module, a purchasing and sales discrepancy management module, a pipeline network engineering management module, and a comprehensive office management module, etc.

In some embodiments, a clarity and a convenience and efficiency of the operation and running of the gas management process may be realized through separate managements and settings of the smart customer service management sub-platform and the smart operation management sub-platform. Each management sub-platform may obtain, from the smart gas data center, gas management related data and send the management operation running data to the smart gas data center. The smart gas management platform 130 may interact with the smart gas service platform 120 and the smart gas sensor network platform 140 through the smart gas data center, respectively.

In some embodiments, the smart operation management sub-platform may predict a difference magnitude for the gas supply and demand difference that occurs at the future time point in the at least one target region.

The smart gas sensor network platform 140 may be a functional platform that manages the sensing communications. In some embodiments, the smart gas sensor network platform 140 may include a gas indoor device sensor network sub-platform and a gas pipeline network device sensor network sub-platform.

The gas indoor device sensor network sub-platform may be in bi-directional communication with the smart gas data center, and in some embodiments, the gas indoor device sensing network sub-platform may include modules for network management, protocol management, command management, and data parsing.

The gas pipeline network device sensing network sub-platform may be in bi-directional communication with the smart gas data center. In some embodiments, the gas pipeline network device sensing network sub-platform may include modules for network management, protocol management, command management, and data parsing.

The smart gas object platform 150 may be a functional platform for perceptual information generation and controlling information execution. In some embodiments, the smart gas object platform 150 may include a gas indoor device object sub-platform and a gas pipeline network device object sub-platform.

In some embodiments, the gas indoor device object sub-platform may be configured as various types of gas indoor devices for the gas users.

In some embodiments, the indoor device may include a gas metering device, e.g., a gas meter, a flow meter, a data collector, etc. for the gas user.

In some embodiments, the gas network device object sub-platform may be configured as various types of gas network devices and monitoring devices.

In some embodiments, the pipeline network device may include a gas gate station compressor, a pressure regulating device, a gas flow meter, a valve control device, a thermometer, a barometer, etc.

In some embodiments, the gas pipeline device object sub-platform may obtain gas statistical data to be uploaded to the smart gas data center via the gas pipeline device sensing network sub-platform.

In some embodiments of the present disclosure, based on the IoT system 100 for smart gas pipeline network gas supply and deployment, a closed loop of information operation between the smart gas object platform 150 and the smart gas user platform 110 may be formed. The IoT system 100 may run coordinately and regularly under a unified management of the smart gas management platform 130, realizing informatization and intellectualization of the gas operation and management.

Figure 2:
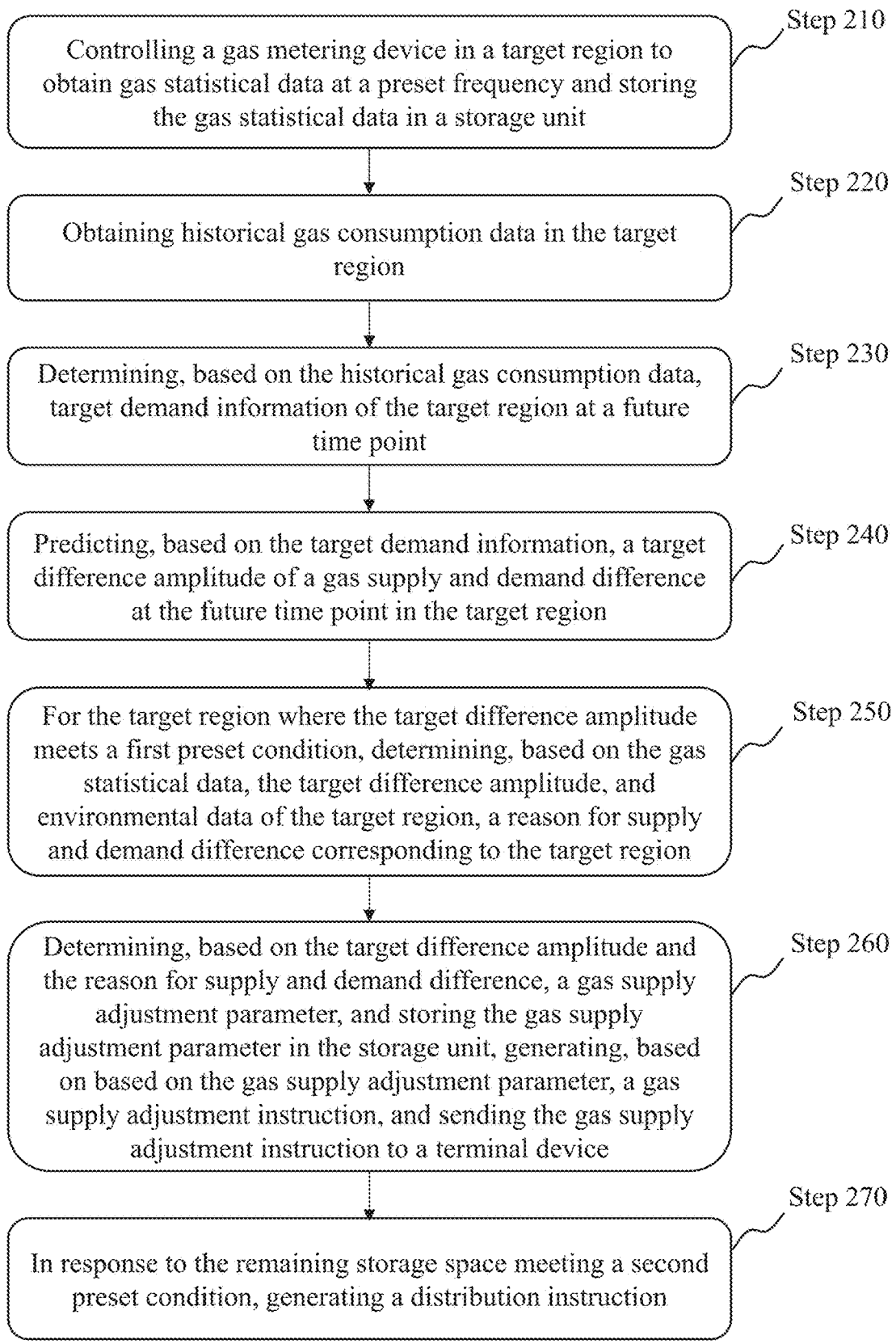
FIG. 2 is a flowchart illustrating an exemplary method for gas supply deployment of smart gas pipeline network according to some embodiments of the present disclosure.

FIG. 2 is a flowchart illustrating an exemplary method for gas supply deployment of smart gas pipeline network according to some embodiments of the present disclosure. As shown in FIG. 2, a process 200 may include the following steps. In some embodiments, the process 200 may be performed by the smart gas management platform 130.

Step 210, controlling a gas metering device in a target region to obtain gas statistical data at a preset frequency and storing the gas statistical data in a storage unit.

The target region refers to a region where gas is supplied through a gas pipeline. In some embodiments, the target region may be a region where one or more commercial and industrial gas users are located. The commercial and industrial gas users may include restaurants, gas power plants, etc.

In some embodiments, the smart gas management platform 130 may determine the target region in various manners. For example, the smart gas management platform 130 may determine the region where the commercial and industrial users use the gas during a historical time period as the target region.

The gas metering device may be used to measure gas-related data. The gas metering device may include a flow sensor, a data collector, etc. The flow sensor may be used to measure a flow rate of the gas. Operating parameters of the flow sensor may include a flow range, a response time, etc. The flow range refers to a range of gas flow that the flow sensor is able to measure. The response time refers to a time used by the flow sensor from receiving a change in the gas flow rate to generating a measurement result. The measurement result may include, for example, an amount of change in the gas flow rate.

The data collector may be used to collect and process the data measured by the flow sensor. The operating parameters of the data collector may include a data storage capacity, a communication interface, etc. The data storage capacity refers to a capacity of measurement data that is able to be stored by the data collector. The communication interface may indicate a type of interface through which the data collector performs data communication with other devices. For example, the type of the communication interface may include at least one of RS-485, Modbus, Ethernet, a wireless communication interface, and a fiber optic communication interface.

The gas statistical data refers to the data related to the gas usage. In some embodiments, the gas statistical data may include at least a user type, a gas delivery volume, fault data, maintenance data, etc. The user type may include a gas supervisory user, a gas usage user, a gas service user, etc. The gas delivery volume may be expressed by a volume of gas delivered over a period of time or a delivery rate. The fault data may include a type of fault, a number of faults, a frequency of faults, etc., over a certain historical time period. The maintenance data may include a frequency of maintenance, a number of times of maintenance, a result of maintenance, etc.

The preset frequency refers to a frequency of obtaining the gas statistical data. For example, the gas metering device may obtain the gas statistical data at a frequency of once every 10 minutes. In some embodiments, the preset frequency may be preset by those skilled in the art based on experience.

In some embodiments, the preset frequency may also be obtained through a preset relationship table. For example, the smart gas management platform 130 may calculate, based on the response time and/or a measurement range of the flow sensor of the gas metering device in the target region, and the data storage capacity of the data collector, an average response time, an average measurement range, and an average data storage capacity; determine the communication interface type that is used most frequently as an overall communication interface type in the target region; and construct a table of correspondence between the preset average response time, the average measurement range, the average data storage capacity, and the overall communication interface type, and the frequency. The smart gas management platform 130 may further, by checking the table, take the frequency corresponding to the average response time, the average measurement range, the average data storage capacity, and overall communication interface type obtained through calculation or statistic as the preset frequency.

In some embodiments, the smart gas management platform 130 may obtain the gas statistical data with a preset frequency. For example, the gas metering device may upload gas statistical data to the smart gas management platform 130 at a preset frequency. In some embodiments, the smart gas management platform 130 may send the obtained gas statistical data to the storage unit through a communication interface between the processor and the storage unit. In some embodiments, the smart gas data center may be configured as a storage device, and the storage unit may be deployed in the storage device for storing data related to the IoT system for smart gas pipeline network gas supply and distribution.

Step 220, obtaining historical gas consumption data in the target region.

Historical gas consumption data refers to a cumulative gas consumption measured by the gas metering device. For example, the historical gas consumption data may include the cumulative gas consumption at different historical moments within a certain historical time period. In some embodiments, the historical gas consumption data for the target region may include the historical gas consumption data corresponding to all gas users in the target region for each day of the historical time period. One gas metering device may correspond to one gas user.

In some embodiments, the historical gas consumption data may be pre-stored in the storage unit. The smart gas management platform 130 may read the historical gas consumption data in the storage unit via the communication interface. In some embodiments, the historical gas consumption data may also be manually uploaded to the smart gas management platform 130.

Step 230, determining, based on the historical gas consumption data, target demand information of the target region at a future time point.

The future time point refers to any time point after current time point. For example, if the current time point is 10:00 AM, the future time point may be 3:00 PM, 10:00 AM the next day, etc.

In some embodiments, the future time point may be determined by those skilled in the art based on actual needs. For example, a peak time point for gas usage may be determined as a future time point. For another example, a plurality of future time points may be set during a peak time period for gas usage, and a smaller number of future time points may be set at a valley time period for gas usage.

In some embodiments, the number of future time points may be positively correlated with a remaining storage space of the storage unit. That is, the greater the remaining storage space of the storage unit, the greater the number of future time points may be set.

The target demand information refers to gas demand information corresponding to the future time point. For example, the target demand information may be the gas demand at the future time point, etc.

In some embodiments, the smart gas management platform 130 may determine the target demand information based on the historical gas consumption data in various manners. For example, the smart gas management platform 130 may count the historical gas consumption data corresponding to different historical time points during a day. Exemplarily, a gas consumption at moment T1 may be obtained by subtracting the historical gas consumption data at moment T0 from the historical gas usage data at moment T1, where, the moment T1 denotes the next moment to report the gas consumption data after the reporting of the gas consumption data at the moment T0, and a time interval between the moment T1 and the moment T0 may be shorter than a time interval threshold to facilitate obtaining a more accurate gas consumption at the moment T1. The time interval threshold may be preset by those skilled in the art based on experience or may be obtained by other feasible means. In turn, the smart gas management platform 130 may count all historical gas consumption corresponding to a historical time point within a certain historical time period, and take an average of all the historical gas consumptions as a gas demand volume for a future time point corresponding to the historical time point time point.

For another example, the smart gas management platform 130 may draw a gas consumption curve of a day based on the gas consumption corresponding to different historical time points in the day, then draw a plurality of gas consumption curves of a certain historical time period, and fit the plurality of gas consumption curves to obtain a reference demand curve. The reference demand curve may include a reference time point and a reference gas consumption corresponding to the reference time point. The smart gas management platform 130 may take the reference gas consumption of the reference time point corresponding to the future time point of as the gas demand volume in the target demand information.

Step 240, predicting, based on the target demand information, a target difference amplitude of a gas supply and demand difference at the future time point in the target region.

The gas supply and demand difference refers to a difference between the gas delivery volume and the gas demand volume at a future time point. For example, the gas supply and demand difference may be expressed as (gas delivery volume-gas demand volume). When the gas supply and demand difference is negative, it indicates that there may be a scarcity of gas; when the gas supply and demand difference is positive, it indicates that there is an abundance of gas; and when the gas supply and demand difference is zero, it indicates that the gas supply-demand has reached an equilibrium.

In some embodiments, the smart gas management platform 130 may obtain the gas supply and demand difference in various manners. For example, the smart gas management platform 130 may calculate a gas delivery rate based on the data of the flow sensor, predict the gas delivery volume at a future time point, and calculate the future time point of the gas supply and demand difference combining the target demand information corresponding to the future time point.

In some embodiments, the gas supply and demand difference may be obtained by the adjustment model. For a specific way of obtaining the gas supply and demand difference based on the adjustment model, please refer to FIG. 5 and the related descriptions.

The target difference amplitude refers to a magnitude of change in the gas supply and demand difference. The greater the change in gas supply and demand difference, the greater the target difference amplitude. The target difference amplitude may be expressed in any feasible way by numerical value (e.g., 10, 20, etc.), degree (e.g., large, normal, small, etc.), etc. The greater the target difference amplitude, the greater the demand for gas at the future time point and the greater the need for a focused staff monitoring.

In some embodiments, the smart gas management platform 130 may use a value of the gas supply and demand difference as the target difference amplitude. In some embodiments, the smart gas management platform 130 may preset a table of preset relationships between the gas supply and demand difference and the target difference amplitude, and determine the target difference amplitude corresponding to the gas supply and demand difference by checking the table.

In some embodiments, the smart gas management platform 130 may obtain a plurality of groups of reference difference curves based on a plurality of groups of historical delivery volume curves and the target demand information; determine the target difference curve at the future time point by performing a weighting process on the plurality of groups of reference difference curves; and determine, based on the target difference curve and an adjustment coefficient, the target difference amplitude. For definitions of the reference difference curves, the target difference curves, and the adjustment coefficients, as well as a detailed description of this section, please refer to FIG. 3 and its contents.

Step 250, for the target region in which the target difference amplitude meets a first preset condition, determining, based on the gas statistical data, the target difference amplitude, and environmental data of the target region, a reason for supply and demand difference corresponding to the target region.

The first preset condition refers to a condition that needs to be met to determine the target region for the reason for the supply and demand difference. In some embodiments, the first preset condition may be that the target difference amplitude of the gas supply and demand difference that occurs at any future time point exceeding a difference threshold. The difference threshold may be preset by those skilled in the art based on the experience.

The environmental data refers to the environmental data related to the supply and demand difference. For example, the environmental data may be a temperature, a humidity, a rainfall condition, etc. In some embodiments, the smart gas management platform 130 may obtain the environmental data by any feasible means. For example, the data such as temperature, humidity, etc. may be obtained via various sensors. For another example, the rainfall etc. may be obtained via the Internet or a satellite device.

The reason for supply and demand difference refers to the reason that causes the gas to generate a supply/demand difference.

In some embodiments, the reason for supply and demand difference may include a fault type reason and a non-fault type reason.

The fault type reason refers to the reason that leads to gas supply and demand difference due to a device fault. The fault type reason may include a metering device fault, a pipeline fault, etc. For example, the metering device fault may include an inaccurate measurement of the flow sensor, a communication interface fault, etc.; and the pipeline fault may include a pipeline leakage, a pipeline aging, etc.

The non-fault type reason refers to the fault that leads to gas supply and demand difference due to reasons beside the device fault. The non-fault type reason may include an external factor. For example, the external factor may be a surge in traffic, etc.

In some embodiments, the smart gas management platform 130 may determine the reason for supply and demand difference through a vector. For example, the smart gas management platform 130 may obtain historical gas statistical data, a historical difference amplitude, historical environmental data, and the corresponding historical reason for the supply and demand difference in a historical time period. The smart gas management platform 130 may construct a historical vector $\vec{m}=(a, b, c)$, where each element denotes the historical gas statistical data, the historical target difference amplitude, and the historical environmental data, a target region vector $\vec{n}=(a1, b1, c1)$, where each element denotes the gas statistical data, the target difference amplitude, and the environmental data of the target region. Then, through a vector calculation, the smart gas management platform 130 may take historical reason for supply and demand difference corresponding to the historical vector with the smallest vector distance from the target region vector as the reason for supply and demand difference in the target region.

In some embodiments, the smart gas management platform 130 may determine the reason for supply and demand difference through a reason model based on the gas statistical data, the target difference amplitude, and the environmental data. For a specific description of this, please refer to FIG. 4 and the contents thereof.

Step 260, determining, based on the target difference amplitude and the reason for supply and demand difference, a gas supply adjustment parameter, storing the gas supply adjustment parameter in the storage unit, generating, based on based on the gas supply adjustment parameter, a gas supply adjustment instruction, and sending the gas supply adjustment instruction to a terminal device.

The gas supply adjustment parameter refers to an adjustment parameter for the gas supply. The gas supply adjustment parameter may include a gas replenishment time, a gas replenishment volume sequence, whether or not to maintain, etc. In some embodiments, the gas replenishment time may be a future time point when the target difference amplitude is greater than a difference magnitude threshold. The difference magnitude threshold may be preset.

In some embodiments, the gas replenishment volume sequence may be a sequence consisting of gas replenishment corresponding to all gas replenishment times. For example, the gas supply adjustment parameter may include gas replenishment times of 7:00, 12:00, and 18:00, which correspond to a gas replenishment volumes of 50 m³, 100 m³, and 150 m³, and the gas replenishment volume sequence may be expressed as (50, 100, 150).

A gas supply adjustment instruction refers to an instruction used to perform the gas supply adjustment parameter.

In some embodiments, the smart gas management platform 130 may determine the gas supply adjustment parameter based on the target difference amplitude, the reason for supply and demand difference in various manners. For example, the smart gas management platform 130 may determine, based on the reason for supply and demand difference being a surge in the traffic flow, a time point of the surge in the traffic flow as a gas replenishment time, and determine, based on the target difference amplitude and the gas demand volume corresponding to the gas replenishment time, the gas replenishment volume, which in turn determine the gas replenishment volume sequence based on different gas replenishment times.

In some embodiments, the smart gas management platform 130 may generate the gas supply adjustment instruction based on the gas supply adjustment parameter and send the gas supply adjustment instruction to the terminal device. For example, when the gas supply adjustment parameter includes the gas replenishment time and the gas replenishment sequence, the adjustment instruction may include: controlling the gas supply device by a staff member to replenish for a corresponding gas replenishment at the gas replenishment time.

In some embodiments, in response to that the reason for supply and demand difference is the fault type reason, the gas supply adjustment parameter may include fault information, and the smart gas management platform 130 may generate a maintenance instruction based on the gas supply adjustment parameter and send the maintenance instruction to the terminal device.

The fault information refers to information related to the corresponding fault type reason. The fault information may include the fault type, a fault probability, etc. The fault type may include a fault type reason. For example, the fault type reason may include a metering terminal fault, a pipeline fault, etc. The fault probability refers to a probability of triggering the fault type reason.

In some embodiments, the fault type may be determined by manual judgment. In some embodiments, the fault probability may be obtained based on the historical data. For example, a ratio of a number of times such faults have occurred historically to a total number of times such faults have occurred may be used as the fault probability of such faults occurring. In some embodiments, the fault probability may also be obtained by reason model. Please refer to FIG. 5 for a description of a manner in which the fault probability is obtained based on the reason model.

In some embodiments, the smart gas management platform 130 may generate the maintenance instruction based on the fault information. The maintenance instruction may include information such as a maintenance time, a maintenance device, and a maintenance personnel, etc. For example, the smart gas management platform 130 may determine an device A with a fault probability higher than a probability threshold to be the maintenance device, determine a time point B at which the gas demand volume is less than a demand volume threshold to be the repair time, and take a person C who is responsible for resolving this type of fault as the maintenance personnel, and thus, the corresponding maintenance instruction may include the maintenance of the device A by the personnel C at the time point B. In some embodiments, the smart gas management platform 130 may issue the maintenance instruction to the terminal device of the personnel so that the maintenance may be performed in time to resolve the fault.

In some embodiments, in response to that the reason for supply and demand difference is the non-fault type reason, the gas supply adjustment parameter may include a gas replenishment parameter, and the smart gas management platform 130 may generate a deployment instruction based on the gas replenishment parameter and send the deployment instruction to the terminal device.

The gas replenishment parameter refers to a gas replenishment volume determined based on a non-fault type reason. For example, the gas replenishment parameter may be 50 m$^3$ of gas replenished at 12:00. In some embodiments, the smart gas management platform 130 may use the gas supply and demand difference at a future time point as the gas replenishment parameter. In some embodiments, the gas replenishment parameter may also be determined by the adjustment model. For more descriptions of the adjustment model, please refer to the corresponding descriptions of the FIG. 5.

In some embodiments, the smart gas management platform 130 may generate the deployment instruction based on gas replenishment network parameter. The deployment instruction may include a gas replenishment time, a gas replenishment volume, a staff, etc. For example, the smart gas management platform 130 may determine, based on a gas replenishment time D in the gas replenishment parameter, that a staff member E who is free at the gas replenishment time performs the gas deployment operation, and determine, based on a gas replenishment volume F, an operation brief corresponding to the gas supply device, etc., and thus, the deployment instruction may include the staff E performing a gas deployment operation of the gas replenishment amount F at the gas replenishment time D. The smart gas management platform 130 may send the deployment instruction to a terminal of the staff member for execution.

Based on the different reasons for supply and demand difference, targeted gas replenishment or fault maintenance may be performed in order to solve the problem of insufficient supply of gas in a suitable manner to ensure a normal use for the gas users.

Step 270, in response to the remaining storage space meeting a second preset condition, generating a distribution instruction.

The second preset condition refers to a condition that requires a storage space distribution. In some embodiments, the second preset condition may be that the remaining storage space is less than a space capacity threshold. The space capacity threshold may be preset.

The distribution instruction refers to the instruction required for performing the storage space distribution.

In some embodiments, the distribution instruction may be configured to store gas statistical data obtained by each gas metering device based on a distribution ratio of available storage space in each target region. In some embodiments, the distribution ratio of the available storage space for the each target region may be preset by a staff member. In some embodiments, the distribution ratio may also be positively correlated with the number of gas metering devices. The greater the number of gas metering devices, the greater the distribution ratio. It may be noted that when presetting the distribution ratios, the available storage spaces in all target regions does not exceed the remaining storage space of the storage device.

Based on the method for gas supply deployment of smart gas pipeline network described in the embodiments of the present disclosure, it may be possible to more accurately predict the gas supply volume and the gas demand volume at different future time points, and for different reasons for supply and demand difference, select appropriate manners to carry out the gas replenishment or the device maintenance. At the same time, it may focus on the supervision of areas with great gas demand volume or great difference magnitude to ensure the normal use for the gas users.

Figure 3:
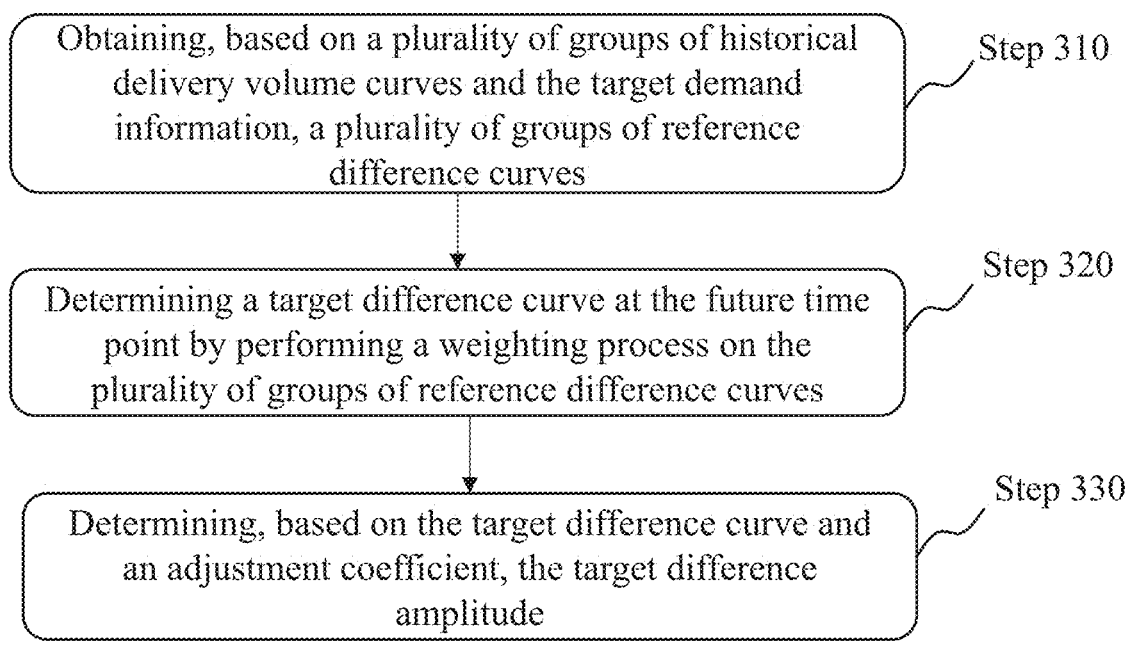
FIG. 3 is a flowchart illustrating an exemplary process for predicting a target difference amplitude according to some embodiments of the present disclosure.

FIG. 3 is a flowchart illustrating an exemplary process for predicting a target difference amplitude according to some embodiments of the present disclosure.

Step 310, obtaining, based on a plurality of groups of historical delivery volume curves and the target demand information, a plurality of groups of reference difference curves.

The historical delivery volume curve refers to a curve drawn based on the gas deliveries at different moments of a day in historical gas statistical data. For example, the historical delivery volume curve may be drawn with time as an x-axis and gas delivery as a y-axis. In some embodiments, the historical delivery volume curve may be a curve corresponding to the gas delivery volume for each user, or it may be a curve corresponding to a total gas delivery volume for all users.

The reference difference curve refers to a curve that reflects the gas supply and demand difference. In some embodiments, the smart gas management platform 130 may subtract the gas demand volume from the gas delivery volume to obtain the gas supply and demand difference, take the gas supply and demand difference as the y-axis, and take the time as the x-axis to draw the reference difference curve. In some embodiments, the smart gas management platform 130 may draw a group of reference difference curves based on a group of historical gas delivery curves and the target demand information, and repeat the above to obtain a plurality of groups of reference difference curves.

For more descriptions of the target demand information, please refer to FIG. 2.

Step 320, determining a target difference curve at the future time point by performing a weighting process on the plurality of groups of reference difference curves.

The target difference curve refers to a curve including the gas supply and demand difference corresponding to the future time point. For example, the target difference curve may include different future time points and their corresponding gas supply and demand differences.

In some embodiments, the smart gas management platform 130 may weight the plurality of reference difference curves to determine a target difference curve at the future time point. For example, the smart gas management platform 130 may weight and average all gas supply and demand differences at each moment in the plurality of groups of reference difference curves, and take a result of the weighted average as the gas supply and demand difference at the moment. By analogy, the gas supply and demand differences at different moments of the day may be obtained, and the moments after the current time point may be taken as the future time point, and thus the target difference curves may be drawn based on the different moments and the corresponding gas supply and demand differences.

In some embodiments, a weight of the weighting process may be negatively correlated to a time interval between a historical date of a collection of the historical delivery volume curve and the current date.

When the historical date is closer to the current date, the weight of the reference difference curve may be higher; when the historical date is farther from the current date, the weight of the reference difference curve may be lower. A sum of the weights of the plurality of reference difference curves may be 1.

By assigning different weights to the reference difference curves for different dates, more accurate predictions of the target difference curves may be achieved.

Step 330, determining, based on the target difference curve and an adjustment coefficient, the target difference amplitude.

The adjustment coefficient refers to a coefficient for adjusting the gas supply and demand difference. The adjustment coefficient may be expressed in any feasible way by decimals, percentages, etc. In some embodiments, the adjustment coefficient may be manually set by a staff member. In some embodiments, the adjustment coefficient may be obtained from a preset table. For example, a correspondence between the gas supply and demand difference and the adjustment coefficient may be preset, so that the adjustment coefficient is able to be determined by checking the table.

In some embodiments, the adjustment coefficient may be positively correlated with estimated order data for a target gas user at a future time point, the target gas user being a commercial and industrial user. The estimated order data refers to the estimated order data of the target gas user at the future time point, e.g., an estimated order volume, etc. A greater estimated order data indicates a greater traffic flow or consumption volume, which to a certain extent reflects a greater gas demand. At this time, an impact of the gas supply and demand difference may be more obvious.

Thus, setting a higher adjustment coefficient for target regions with greater estimated order data may facilitate stronger monitoring and reduce losses due to insufficient gas supply.

In some embodiments, the smart gas management platform 130 may multiply values corresponding to each time point on the target difference curve for the future time points by the adjustment coefficient to obtain the target difference amplitude. For example, for a group of target difference curves (100, 150, 200) with an adjustment coefficient of 0.4, the target difference amplitude is (40, 60, 80).

In some embodiments of the present disclosure, the gas supply and demand difference at the future time point may be estimated by the historical delivery volume of gas and the target demand information, and the difference magnitude at the future time point may then be determined, which facilitates the strengthening of supervision for the region with a great difference magnitude. In this way, the gas may be replenished in time to reduce the loss caused by insufficient gas supply.

Figure 4:
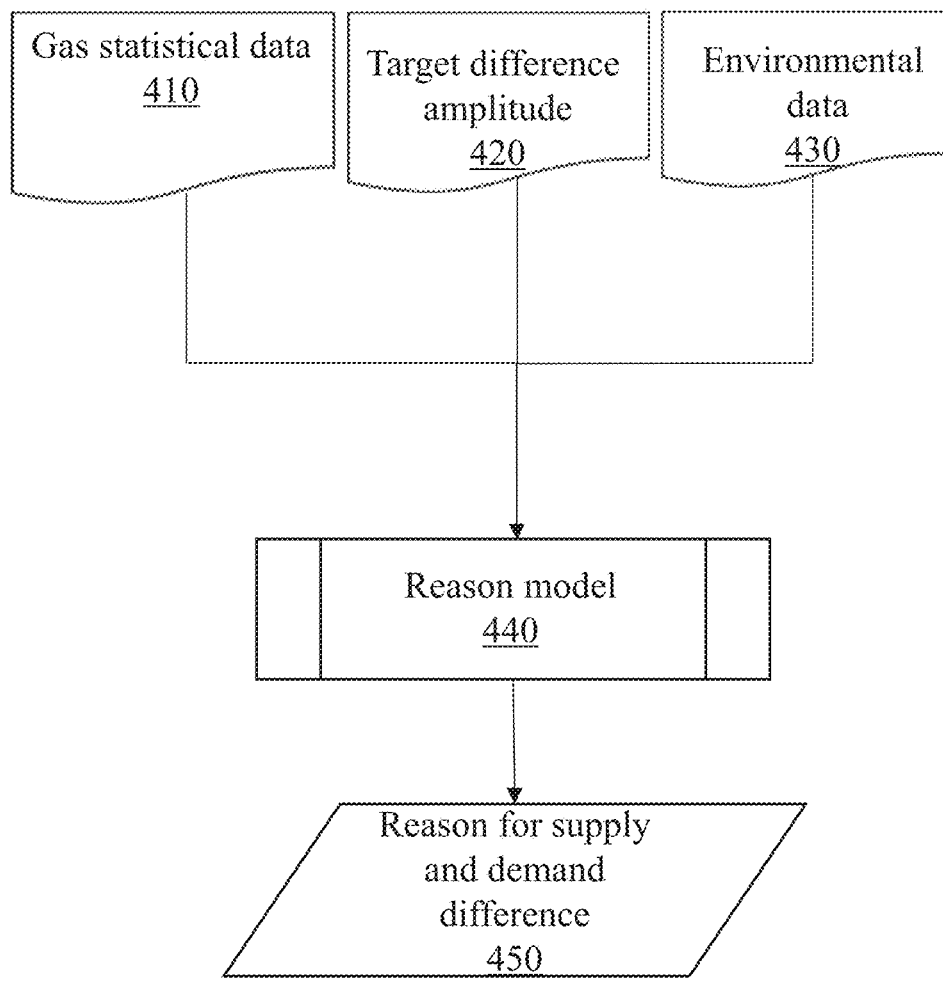
FIG. 4 is a schematic diagram illustrating an exemplary reason model according to some embodiments of the present disclosure.

FIG. 4 is a schematic diagram illustrating an exemplary reason model according to some embodiments of the present disclosure.

The reason model may be a machine learning model, such as a support vector machine (SVM) and a deep neural network (DNN).

In some embodiments, inputs to the reason model 440 may include gas statistical data 410, a target difference amplitude 420, and environmental data 430, please refer to the preceding section for specific descriptions of the gas statistical data, the target difference amplitude, and the environmental data.

In some embodiments, an output of the reason model 440 may be a reason for supply and demand difference 450.

In some embodiments, the reason for supply and demand difference may be a reason that leads to a generation of the gas supply and demand difference, such as a metering terminal fault, a pipeline fault, an external factor, etc.

In some embodiments, the reason model may be obtained by training based on a great number of first training samples with labels, for example, a plurality of first training samples with first labels may be input to an initial reason model, and the reason for supply and demand difference may be output. Through the first label and reason for supply and demand difference, a loss function may be constructed. Parameters of the initial reason model may be updated based on the loss function to obtain a trained reason model.

The first training sample may include sample gas statistical data, sample target difference amplitude, and sample environmental data. The first label may be a historical reason for supply and demand difference in the target region. In some embodiments, the first training sample and the first label may be obtained based on historical data. Further description of the training of the reason model may be found in related description in FIG. 4.

The method shown in some embodiments of the present disclosure takes into account data information such as the gas statistical data, the target difference amplitude, the environmental data, and other data information when determining that a amplitude of the gas supply and demand difference occurs at any future time point exceeds a amplitude threshold, and may make the determined reason for supply and demand difference more realistic and improve an efficiency of gas supply and demand distribution.

Figure 5:
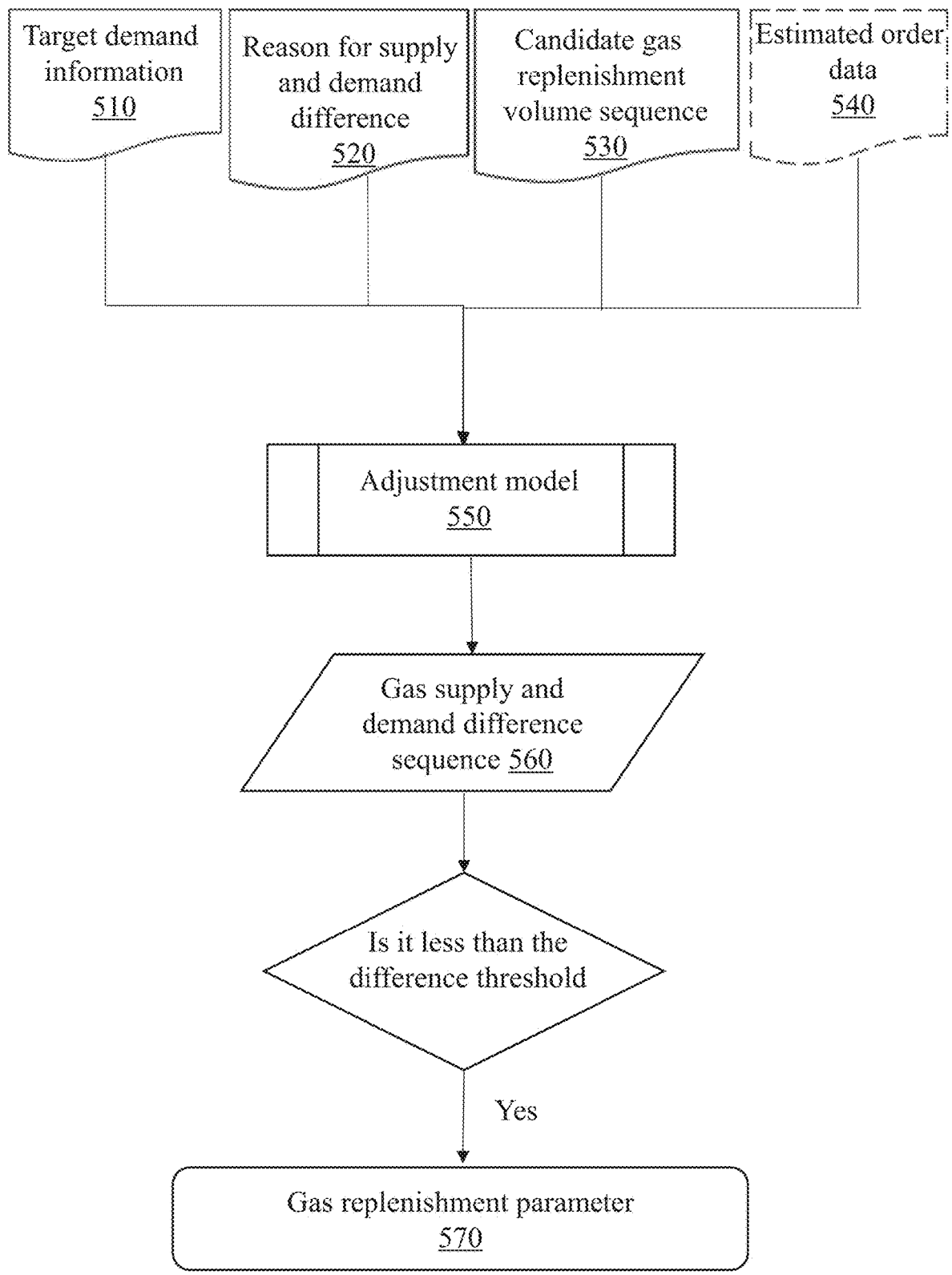
FIG. 5 is a schematic diagram illustrating an exemplary process for determining a gas replenishment parameter based on an adjustment model according to some embodiments of the present disclosure.

FIG. 5 is a schematic diagram illustrating an exemplary process for determining a gas replenishment parameter based on an adjustment model according to some embodiments of the present disclosure.

In some embodiments, the smart gas management platform 130 may determine, based on target demand information 510, a reason for supply and demand difference 520, and a candidate gas replenishment volume sequence 530, a gas supply and demand difference sequence 560 corresponding to adjusted gas replenishment time by an adjustment model 550; and determine whether the gas supply and demand difference sequence 560 is less than a difference threshold. In response to that the gas supply and demand difference sequence 560 is less than a difference threshold, the smart gas management platform 130 may determine a gas replenishment parameter 570 based on the gas supply and demand difference sequence 560.

The candidate gas replenishment volume sequence refers to gas replenishment volume sequence for gas replenishment at different time points to be selected. In some embodiments, the candidate gas replenishment volume sequence may be obtained based on historical data. For example, the gas replenishment volume sequences within different days of the history may be used as the candidate gas replenishment volume sequences, which in turn generates a plurality of candidate gas replenishment volume sequences. For descriptions of the gas replenishment volume sequence, please refer to related contents in FIG. 2.

In some embodiments, for each gas replenishment time, a number of candidate gas replenishment volumes may be randomly generated within a preset range of the target difference amplitude based on the corresponding gas supply and demand difference, and the candidate gas replenishment volume sequence may then be obtained.

The adjustment model 550 may be used to determine the adjusted gas supply and demand difference sequence 560. The adjustment model 550 may be a machine learning model, e.g., a long short-term memory (LSTM) model, etc.

In some embodiments, inputs to the adjustment model 550 may include the target demand information 510, the reason for supply and demand difference 520, and the candidate gas replenishment volume sequence 530, and the outputs may include, the gas supply and demand difference sequence 560 corresponding to each gas replenishment time after an adjustment based on the candidate gas replenishment volume sequence 530. The gas supply and demand difference sequence 560 may include the gas supply and demand difference corresponding to each gas replenishment time.

In some embodiments, the adjustment model 550 may be obtained by joint training with the reason model. An output of the reason model may be the input of the adjustment model.

During the joint training process, the smart gas management platform 130 may input labeled first training sample into an initial reason model to obtain the reason for supply and demand difference output from the initial reason model; then take the reason for supply and demand difference output from the initial reason model and sample target demand information, and sample candidate gas replenishment volume sequence as a second training sample to be input into an initial adjustment model to obtain the gas supply and demand difference output by the initial adjustment model. After that, a loss function may be constructed based on the output of the initial adjustment model and a second label, parameters of the initial reason model and the initial adjustment model may be updated based on the loss function to obtain a trained adjustment model.

The second label may include the gas supply and demand difference corresponding to a historical gas replenishment time. The second training sample and the second label may be obtained based on historical data. For more description of the first training sample and the reason model, please refer to the contents of FIG. 4.

Determining the gas supply and demand difference by adjustment model may improve a calculation efficiency as well as an accuracy of the determined gas supply and demand difference, and at the same time, the joint training approach may facilitate a solution to the difficulty in obtaining the label in separate training.

In some embodiments, the input to the adjustment model 550 may also include estimated order data 540.

The estimated order data refers to a number of orders for all gas commercial and industrial users in the target region. For example, the estimated order data may be 200 orders at 12:00.

In some embodiments, the estimated order data may be obtained in various manners. For example, the smart gas management platform 130 may average the order data at a certain time point in each day of the historical time period, and use the average as the estimated order data for that time point.

When the input to the adjustment model 550 includes the estimated order data 540, the second training sample may also include historical order data. The second training sample may be obtained based on the historical data.

The estimated order data reflects the traffic flow or customer consumption in the target region, which in turn reflects the gas consumption to a certain extent, and affects an adjustment effect of gas replenishment. Taking the estimated order data as the input to the adjustment model helps to consider the impact of an external factors on the gas supply and demand difference.

In some embodiments, the smart gas management platform 130 may determine the gas replenishment parameter that is ultimately performed based on the gas supply and demand difference output by the adjustment model. For example, when the gas supply and demand difference corresponding to each gas replenishment time in the gas supply and demand difference sequence output by the adjustment model is less than a supply and demand difference threshold, the candidate gas replenishment volume sequence corresponding to the gas supply and demand difference sequence may be used as the gas replenishment volume corresponding to the gas replenishment time for the final performance. Further example, when there are a plurality of gas supply and demand difference sequences in which the gas supply and demand differences are less than the supply and demand difference threshold, then one gas supply and demand difference sequence may be randomly selected, and the candidate gas replenishment volume sequence corresponding to that gas supply and demand difference sequence may be taken as the final gas replenishment volume corresponding to the gas replenishment time for the final performances. Alternatively, a plurality of candidate gas replenishment volume sequences corresponding to each gas replenishment time in the plurality of gas supply and demand difference sequences may be averaged. The average value may be taken as the gas replenishment volume for the gas replenishment time for final execution. The supply and demand difference threshold may be preset.

Determining the gas supply and demand difference based on the adjustment model may reduce an error of manual calculation and improve the accuracy of the prediction. Further, based on the gas supply and demand difference, the most appropriate of gas replenishment volume may be selected for replenishment to minimize the loss of insufficient gas supply, thereby avoiding a gas waste.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. such as "an embodiment," "an embodiment," and/or "some embodiment" means a feature, structure, or characteristic associated with at least one embodiment of the present disclosure. Accordingly, it should be emphasized and noted that "one embodiment" or "an embodiment" or "an alternative embodiment" in different places in the present disclosure do not necessarily refer to the same embodiment. In addition, certain features, structures, or characteristics in one or more embodiments of the present disclosure may be suitably combined.

Furthermore, unless expressly stated in the claims, the order of the processing elements and sequences, the use of numerical letters, or the use of other names as described in the present disclosure are not intended to qualify the order of the processes and methods of the present disclosure. While some embodiments of the present disclosure that are currently considered useful are discussed in the foregoing disclosure by way of various examples, it is to be understood that such details serve only illustrative purposes and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aiding in the understanding of one or more embodiments of the present disclosure, the foregoing descriptions of embodiments of the present disclosure sometimes combine a variety of features into a single embodiment, accompanying drawings, or descriptions thereof. However, this method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about," "approximately," or "substantially". Unless otherwise noted, the terms "about," "approximately," or "approximately" indicates that a ±20% variation in the stated number is allowed. Correspondingly, in some embodiments, the numerical parameters used in the present disclosure and claims are approximations, which changes depending on the desired characteristics of individual embodiments. In some embodiments, the numerical parameters should consider the specified number of valid digits and use a general digit retention method. While the numerical domains and parameters used to confirm the breadth of their ranges in some embodiments of the present disclosure are approximations, in specific embodiments, such values are set to be as precise as possible within a feasible range.

It should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for gas supply deployment of smart gas pipeline network performed based on a smart gas management platform of an Internet of Things (IoT) system for gas supply deployment of smart gas pipeline network, wherein the IoT system for gas supply deployment of smart gas pipeline network includes a smart gas user platform, a smart gas service platform, a smart gas management platform, a smart gas sensor network platform, and a smart gas object platform, wherein the smart gas management platform includes a smart gas data center, the smart gas data center being configured as a storage device, a storage unit is deployed in the storage device for storing data related to the IoT system for gas supply deployment of smart gas pipeline network, and the smart gas object platform includes a gas metering device;

the method comprising:

controlling the gas metering device in a target region to obtain gas statistical data at a preset frequency and storing the gas statistical data in a storage unit through a communication interface between a processor and the storage unit, wherein the gas metering device includes a flow sensor and a data collector;

calculating, by the smart gas management platform, the preset frequency, including:
  calculating, based on a response time and/or a measurement range of the flow sensor of the gas metering device in the target region, and a data storage capacity of the data collector, an average response time, an average measurement range, and an average data storage capacity;
  determining a communication interface type that is used most frequently as an overall communication interface type in the target region; and
  constructing a table of correspondence between a preset average response time, the average measurement range, the average data storage capacity, and the overall communication interface type, and the frequency;
  by checking the table, taking a frequency corresponding to the average response time, the average measurement range, the average data storage capacity, and the overall communication interface type obtained through calculation or statistic as the preset frequency;
obtaining historical gas consumption data in the target region, the historical gas consumption data being pre-stored in the storage unit;
determining, based on the historical gas consumption data, target demand information of the target region at a future time point, a number of the future time point being positively related to a remaining storage space of the storage unit;
predicting, based on the target demand information, a target difference amplitude of a gas supply and demand difference at the future time point in the target region;
for the target region where the target difference amplitude meets a first preset condition, determining, based on the gas statistical data, the target difference amplitude, and environmental data of the target region, a reason for supply and demand difference corresponding to the target region;
wherein for the target region where the target difference amplitude meets the first preset condition, the determining, based on the gas statistical data, the target difference amplitude, and the environmental data of the target region, the reason for supply and the demand difference corresponding to the target region comprises:
  determining, based on the gas statistical data, the target difference amplitude, and the environmental data, the reason for supply and demand difference through a reason model, the reason model being a support vector machine;
determining, based on the target difference amplitude and the reason for supply and demand difference, a gas supply adjustment parameter, and storing the gas supply adjustment parameter in the storage unit, generating, based on the gas supply adjustment parameter, a gas supply adjustment instruction, and sending the gas supply adjustment instruction to a terminal device, wherein
  the gas supply adjustment parameter is stored in the smart gas data center;
  the gas supply adjustment instruction is sent to the smart gas service platform or sent to the gas network device object sub-platform via a gas network device sensing network sub-platform; and
  the reason for supply and demand difference includes a fault type reason and a non-fault type reason;

in response to that the reason for supply and demand difference is the fault type reason, the gas supply adjustment parameter including fault information, the fault information including a fault type and a fault probability, and generating a maintenance instruction based on the gas supply adjustment parameter and sending the maintenance instruction to the terminal device;
in response to that the reason for supply and demand difference is the non-fault type reason, the gas supply adjustment parameters including a gas replenishment parameter, and generating a deployment instruction based on the gas replenishment parameter and sending the deployment instruction to the terminal device;
wherein the gas replenishment parameter is determined based on the target demand information, the reason for supply and demand difference, and a candidate gas replenishment volume sequence by an adjustment model, the adjustment model being a long short-term memory (LSTM) model, and an input of the adjustment model further including estimated order data; wherein
the adjustment model is obtained by joint training with the reason model;
an output of the reason model is an input of the adjustment model; and
during the joint training process, the smart gas management platform inputs labeled first training sample into an initial reason model to obtain a reason for supply and demand difference output from the initial reason model; then the reason for supply and demand difference output from the initial reason model, sample target demand information, sample candidate gas replenishment volume sequence, and historical order data are taken as a second training sample to be input into an initial adjustment model to obtain the gas supply and demand difference output by the initial adjustment model; and a loss function is constructed based on the output of the initial adjustment model and a second label, parameters of the initial reason model and the initial adjustment model are updated based on the loss function to obtain a trained adjustment model; wherein
  the second label includes a gas supply and demand difference corresponding to a historical gas replenishment time;
  the second training sample and the second label are obtained based on historical data;
  the first training sample includes sample gas statistical data, sample target difference amplitude, and sample environmental data;
and
  in response to the remaining storage space meeting a second preset condition, generating a distribution instruction, the distribution instruction being configured to store, based on a distribution ratio of an available storage space of each of the target regions, the gas statistical data obtained by each of the gas metering devices, the distribution ratio being positively related to a number of gas metering devices.

2. The method of claim 1, wherein the predicting, based on the target demand information, a target difference amplitude of a gas supply and demand difference at the future time point in the target region comprises:
  obtaining, based on a plurality of groups of historical delivery volume curves and the target demand information, a plurality of groups of reference difference curves;

determining a target difference curve at the future time point by performing a weighting process on the plurality of groups of reference difference curves; and determining, based on the target difference curve and an adjustment coefficient, the target difference amplitude.

3. An Internet of Things (IoT) system for gas supply deployment of smart gas pipeline network, wherein the IoT system for gas supply deployment of smart gas pipeline network includes a smart gas user platform, a smart gas service platform, a smart gas management platform, a smart gas sensor network platform, a smart gas object platform, and a smart gas safety management platform, wherein the smart gas management platform includes a smart gas data center, the smart gas data center being configured as a storage device, a storage unit is deployed in the storage device for storing data related to the IoT system for gas supply deployment of smart gas pipeline network, the smart gas object platform includes a gas metering device, and the smart gas safety management platform is configured to:

control the gas metering device in a target region to obtain gas statistical data at a preset frequency and store the gas statistical data in a storage unit through a communication interface between a processor and the storage unit, wherein the gas metering device includes a flow sensor and a data collector;

calculate, by the smart gas management platform, the preset frequency, to calculate, by the smart gas management platform, the preset frequency, the smart gas safety management platform is further configured to:

calculate, based on a response time and/or a measurement range of the flow sensor of the gas metering device in the target region, and a data storage capacity of the data collector, an average response time, an average measurement range, and an average data storage capacity;

determine a communication interface type that is used most frequently as an overall communication interface type in the target region; and construct a table of correspondence between a preset average response time, the average measurement range, the average data storage capacity, and the overall communication interface type, and the frequency;

by checking the table, take a frequency corresponding to the average response time, the average measurement range, the average data storage capacity, and the overall communication interface type obtained through calculation or statistic as the preset frequency;

obtain historical gas consumption data in the target region, the historical gas consumption data being pre-stored in the storage unit;

determine, based on the historical gas consumption data, target demand information of the target region at a future time point, a number of the future time point being positively related to a remaining storage space of the storage unit;

predict, based on the target demand information, a target difference amplitude of a gas supply and demand difference at the future time point in the target region;

for the target region where the target difference amplitude meets a first preset condition, determine, based on the gas statistical data, the target difference amplitude, and environmental data of the target region, a reason for supply and demand difference corresponding to the target region;

wherein for the target region where the target difference amplitude meets the first preset condition, to determine, based on the gas statistical data, the target difference amplitude, and the environmental data of the target region, the reason for supply and the demand difference corresponding to the target region, the smart gas safety management platform is further configured to:

determine, based on the gas statistical data, the target difference amplitude, and the environmental data, the reason for supply and demand difference through a reason model, the reason model being a support vector machine;

determine, based on the target difference amplitude and the reason for supply and demand difference, a gas supply adjustment parameter, and store the gas supply adjustment parameter in the storage unit, generate, based on the gas supply adjustment parameter, a gas supply adjustment instruction, and send the gas supply adjustment instruction to a terminal device, wherein the gas supply adjustment parameter is stored in the smart gas data center;

the gas supply adjustment instruction is sent to the smart gas service platform or sent to the gas network device object sub-platform via a gas network device sensing network sub-platform; and the reason for supply and demand difference includes a fault type reason and a non-fault type reason;

in response to that the reason for supply and demand difference is the fault type reason, the gas supply adjustment parameter including fault information, the fault information including a fault type and a fault probability, generate a maintenance instruction based on the gas supply adjustment parameter and send the maintenance instruction to the terminal device;

in response to that the reason for supply and demand difference is the non-fault type reason, the gas supply adjustment parameters include a gas replenishment parameter, and generate a deployment instruction based on the gas replenishment parameter and send the deployment instruction to the terminal device;

wherein the gas replenishment parameter is determined based on the target demand information, the reason for supply and demand difference, and a candidate gas replenishment volume sequence by an adjustment model, the adjustment model being a long short-term memory (LSTM) model, and an input of the adjustment model further including estimated order data; wherein the adjustment model is obtained by joint training with the reason model;

an output of the reason model is an input of the adjustment model; and during the joint training process, the smart gas management platform inputs labeled first training sample into an initial reason model to obtain a reason for supply and demand difference output from the initial reason model; then the reason for supply and demand difference output from the initial reason model, sample target demand information, sample candidate gas replenishment volume sequence, and historical order data are taken as a second training sample to be input into an initial adjustment model to obtain the gas supply and demand difference output by the initial adjustment model; and a loss function is constructed based on the output of the initial adjustment model and a second label, parameters of the initial reason model and the initial adjustment model are updated based on the loss function to obtain a trained adjustment model; wherein the second label includes a gas supply and demand difference corresponding to a historical gas replenishment time;

the second training sample and the second label are obtained based on historical data;

the first training sample includes sample gas statistical data, sample target difference amplitude, and sample environmental data;

and in response to the remaining storage space meeting a second preset condition, generate a distribution instruction, the distribution instruction being configured to store, based on a distribution ratio of an available storage space of each of the target regions, the gas statistical data obtained by each of the gas metering devices, the distribution ratio being positively related to a number of gas metering devices.

4. The IoT system of claim 3, wherein the smart gas safety management platform is further configured to:

obtain, based on a plurality of groups of historical delivery volume curves and the target demand information, a plurality of reference difference curves;

determine a target difference curve at the future time point by performing weighting processing on the plurality of reference difference curves; and determine, based on the target difference curve and the adjustment coefficient, the target difference amplitude.

5. A non-transitory computer-readable storage medium storing computer instructions, wherein when reading the computer instructions in the storage medium, a computer implements the method of claim 1.

6. The method of claim 2, wherein a weight of the weighting process is negatively related to a time interval between a historical date of collecting the historical delivery volume curves and a current date.

7. The method of claim 2, wherein the adjustment coefficient is positively related to estimated order data of a target gas user at the future time point.

8. The method of claim 1, wherein a type of the communication interface includes at least one of RS-485, Modbus, Ethernet, a wireless communication interface, and a fiber optic communication interface.

9. The method of claim 1, wherein the first preset condition is that the target difference amplitude of the gas supply and demand difference that occurs at any future time point exceeds a difference threshold.

10. The method of claim 1, wherein the second preset condition is that the remaining storage space is less than a space capacity threshold.

* * * * *